US007685256B2

(12) United States Patent
Kudo et al.

(10) Patent No.: US 7,685,256 B2

(45) Date of Patent: Mar. 23, 2010

(54) ACTUAL COOKING RESULT MANAGEMENT METHOD, CONTENT MANAGEMENT METHOD, SERVER, AND COOKING APPARATUS

(75) Inventors: Takahiro Kudo, Osaka (JP); Jun Ozawa, Nara (JP); Satoshi Matsuura, Kyoto (JP); Masaaki Sano, Kyoto (JP)

(73) Assignee: Panasonic Corporation, Osaka (JP)

(*) Notice: Subject to any disclaimer, the term of this patent is extended or adjusted under 35 U.S.C. 154(b) by 1040 days.

(21) Appl. No.: 10/474,545

(22) PCT Filed: May 29, 2002

(86) PCT No.: PCT/JP02/05242

§ 371 (c)(1), (2), (4) Date: Oct. 9, 2003

(87) PCT Pub. No.: WO02/097669

PCT Pub. Date: Dec. 5, 2002

(65) Prior Publication Data

US 2004/0107178 A1 Jun. 3, 2004

(30) Foreign Application Priority Data

May 29, 2001 (JP) ............................ 2001-159906

(51) Int. Cl.
*G06F 15/16* (2006.01)
*G06F 15/173* (2006.01)

(52) U.S. Cl. ....................... 709/219; 709/203; 709/217; 709/224

(58) Field of Classification Search ................. 709/203, 709/217–219, 223–225; 700/1, 90
See application file for complete search history.

(56) References Cited

U.S. PATENT DOCUMENTS 5,875,430 A * 2/1999 Koether ......................... 705/1
6,438,578 B1 * 8/2002 Schmid et al. .............. 709/203
6,549,818 B1 * 4/2003 Ali .............................. 700/90

(Continued)

FOREIGN PATENT DOCUMENTS

JP 08-272808 10/1996

(Continued)

OTHER PUBLICATIONS

Notice of Reasons of Rejection for Japanese Patent Application No. 2002-152153 and English translation; Mailed Oct. 19, 2004.

(Continued)

*Primary Examiner*—Nathan Flynn
*Assistant Examiner*—Joshua Joo
(74) *Attorney, Agent, or Firm*—Harness, Dickey & Pierce, P.L.C.

(57) ABSTRACT

For cooking data provided via a communication network, use track records of the cooking data corresponding with their actual use status are accurately managed. When receiving a request for transmission of cooking data from a terminal (S11), a server transmits the cooking data to the terminal (S12, S13), and at this time receives use history data with a microwave oven for previously transmitted cooking data (S14). The server manages use track records of the cooking data based on use history data received from terminals.

12 Claims, 24 Drawing Sheets

U.S. PATENT DOCUMENTS

| | | | | |
|---|---|---|---|---|
| 6,949,729 | B1 * | 9/2005 | Ishikawa et al. | 219/702 |
| 2002/0040395 | A1 * | 4/2002 | Davis et al. | 709/224 |
| 2002/0100286 | A1 * | 8/2002 | Maeda | 62/190 |
| 2002/0120502 | A1 * | 8/2002 | Sakaguchi | 705/14 |
| 2002/0171674 | A1 * | 11/2002 | Paris | 345/700 |
| 2003/0187682 | A1 * | 10/2003 | Ozawa et al. | 705/1 |

FOREIGN PATENT DOCUMENTS

| | | |
|---|---|---|
| JP | 11-088965 | 3/1999 |
| JP | 11-304159 | 11/1999 |
| JP | 2000-266348 | 9/2000 |
| JP | 2000-279103 | 10/2000 |
| JP | 2000-356351 | 12/2000 |
| JP | 2001-22843 A | 1/2001 |
| JP | 2001-090953 | 4/2001 |

OTHER PUBLICATIONS

International Search Report for International Application No. PCT/JP02/05242, mailed Jul. 16, 2002; ISA/JPO.

* cited by examiner

| User ID | Name | Date of update | Menu | No. of times of cooking |
|---|---|---|---|---|
| 002 | ×××× | 010502 | Potato gratin | 13 |
| | | | Sake-dipped steamed fowl | 4 |
| | | | Chinese-flavor eggplant salad | 6 |
| | | | Roasted chicken | 4 |
| 003 | △△△△ | | | |

(b)

| Menu | No. of times of cooking | Rank |
|---|---|---|
| Roasted chicken | 1305 | 1 |
| Potato gratin | 952 | 2 |
| Chinese-flavor eggplant salad | 721 | 3 |
| Sake-dipped steamed fowl | | |

FIG.7

| Menu | No. of times of cooking |
|---|---|
| Potato gratin | 15 |
| Sake-dipped steamed fowl | 5 |
| Cheesecake | 1 |
| Chinese-flavor eggplant salad | 7 |
| Roasted chicken | 8 |
| Stuffed potato | 3 |

| User ID | Name | Date of update | Menu | No. of times of cooking |
|---|---|---|---|---|
| 002 | ×××× | 010515 | Potato gratin | 15 |
| | | | Sake-dipped steamed fowl | 5 |
| | | | Cheesecake | 1 |
| | | | Chinese-flavor eggplant salad | 7 |
| | | | Roasted chicken | 8 |
| | | | Stuffed potato | 3 |
| 003 | △△△△ | | | |

(b)

| Menu | No. of times of cooking | Rank |
|---|---|---|
| Roasted chicken | 1355 | 1 |
| Potato gratin | 987 | 2 |
| Sake-dipped steamed fowl | 763 | 3 |
| Cheesecake | 46 | 21 |
| Stuffed potato | 38 | 22 |

FIG.13

| Operation key | Action |
|---|---|
| Up | Browse |
| Down | Browse |
| Left | Browse |
| Right | Browse |
| Warm | Cooking |
| Cancel | Cooking |
| ⋮ | ⋮ |

FIG.15

| Operation key | Action |
|---|---|
| Previous display | Browse |
| Next display | Browse |
| Heat | Cooking |
| · | · |
| · | · |

FIG.17

| Operation key | Action |
|---|---|
| Contents view | Browse |
| Print | Print |
| : | : |

FIG.19

| Contents title | Appliance used | Screen | Action | Frequency |
|---|---|---|---|---|
| Stuffed potato | Display | Main | Browse | 1 |
| | | Ingredients | Browse | 1 |
| | | Ingredients | Print | 1 |
| | | How to cook | Browse | 2 |
| | | Step2 | Browse | 1 |
| | Microwave oven | Main | Browse | 1 |
| | | Step1 | Browse | 1 |
| | | Step1 | Cooking | 1 |
| | | Step2 | Browse | 2 |
| | | Step3 | Browse | 1 |
| | IH cooking heater | Step3 | Browse | 1 |
| | | Step3 | Cooking | 1 |
| ・・・ | ・・・ | ・・・ | ・・・ | ・・・ |

FIG.23

| Advertiser | Object cooking data | Where to insert |
|---|---|---|
| Smile Food | Stuffed potato | Main screen |
| | | |
| ⋮ | ⋮ | ⋮ |

ACTUAL COOKING RESULT MANAGEMENT METHOD, CONTENT MANAGEMENT METHOD, SERVER, AND COOKING APPARATUS

BACKGROUND OF THE INVENTION

The present invention relates to a technology related to services of transmitting information to a plurality of users via a communication network typified by the Internet.

In recent years, with the rapid spread and advances of the Internet, services of transmitting various kinds of information to users have been provided in a variety of forms.

In such services, there has been constructed a system of managing the use frequency of contents transmitted. In this system, the number of times of downloading of contents from a server is counted, and based on the counted number, the status of use of the contents is managed/evaluated.

PROBLEM TO BE SOLVED

It will cause no problem to manage/evaluate the use status of contents based on the number of times of downloading of the contents when the contents are information to be merely browsed such as news and an article.

However, when the contents are cooking data prepared for cooking with a home cooking appliance, for example, the number of times of downloading of the contents does not necessarily represent the use status of the contents. In other words, such cooking data is considered as having used as contents only when it is actually used for cooking, not when it is merely downloaded.

Therefore, for a type of contents, such as cooking data, which will be of no value if it is only browsed and fails to induce the user to act based on the information, it is necessary to provide a system of accurately managing the actual use status of the contents.

SUMMARY OF TILE INVENTION

An object of the present invention is providing a cooking track record management method by which a use track record corresponding with the actual use status can be accurately managed for cooking data provided via a communication network.

Another object of the present invention is providing a contents management method by which a use track record corresponding with the actual use status can be accurately managed for contents provided via a communication network.

To attain the above objects, the present invention is directed to a cooking track record management method using a server capable of transmitting information to a terminal via a communication network, the server including a cooking data database storing a plurality of pieces of cooking data, the method including the steps of: transmitting cooking data read from the cooking data database to a terminal requesting transmission of the cooking data; receiving use history data with a cooking appliance for transmitted cooking data from the terminal; and managing use track records of the cooking data stored in the cooking data database based on the use history data received from the terminal.

According to the invention described above, history information of actual cooking with cooking appliances by users can be obtained for the cooking data prepared in the cooking data database. Based on the obtained actual use history information, use track records of the cooking data can be managed. In this way, use track records of the cooking data corresponding with their actual use status, which will not be grasped with the mere number of times of downloading of the data, can be accurately managed.

Preferably, the server receives the use history data for previously transmitted cooking data from the terminal when the server receives a request for transmission of cooking data from the terminal or when the server transmits cooking data to the terminal.

Preferably, the server transmits the managed use track records of cooking data to a terminal which requests transmission of the use track records.

Preferably, the cooking appliance is a microwave oven.

Preferably, the cooking data transmitted to the terminal is given to the cooking appliance via a recording medium, and the use history data with the cooking appliance is given to the terminal via the recording medium.

Preferably, the cooking appliance has a communication function and operates as the terminal.

Preferably, the use history data includes data representing the use frequency of cooking data for each action. The cooking appliance preferably includes: an operating section; an input section for reading cooking data; and an operation-action correspondence database representing the correspondence between the operation performed with the operating section and the action for the cooking data read via the input section, and the use frequency of the cooking data for each action is preferably recorded by referring to the operation-action correspondence database.

Preferably, the terminal transmits use history data with a plurality of appliances including the cooking appliance. The use history data preferably includes data representing the use frequency of the cooking data for each appliance.

Preferably, the server transmits advertisement information-inserted cooking data, and the server computes the browse frequency of the advertisement information based on the use history data for the cooking data.

According to another aspect, the present invention is directed to a contents management method using a server capable of transmitting contents to a terminal via a communication network, the server including a contents data database storing a plurality of pieces of contents, the method including the steps of: transmitting contents read from the contents data database to a terminal requesting transmission of the contents; receiving use history data with an appliance adapted to use of the contents for the transmitted contents from the terminal; and managing use track records of the contents stored in the contents data database based on the use history data received from the terminal.

According to the invention described above, history information of actual cooking with cooking appliances by users can be obtained for the contents prepared in the contents database. Based on the obtained actual use history information, use track records of the contents can be managed. In this way, use track records of the contents corresponding with their actual use status, which will not be grasped with the mere number of times of downloading of the data, can be accurately managed.

Preferably, the contents are cooking data, and the appliance is a cooking appliance.

Preferably, the use history data includes data representing the use frequency of contents for each action.

Preferably, the terminal transmits use history data with a plurality of appliances. The use history data preferably includes data representing the use frequency of contents for each appliance.

Alternatively, the present invention is directed to a cooking track record management method using a server capable of communicating with a terminal via a communication network, the method including the steps of: receiving use history data with a cooking appliance for cooking data from one terminal; and managing a use track record of the cooking data based on the use history data received from the terminal.

According to another aspect, the present invention is directed to a server capable of transmitting information to a terminal via a communication network, wherein the server includes a cooking data database storing a plurality of pieces of cooking data, and the server transmits cooking data read from the cooking data database to a terminal requesting transmission of the cooking data, receives use history data with a cooking appliance for transmitted cooking data from the terminal, and manages use track records of the cooking data stored in the cooking data database based on the use history data received from the terminal.

Alternatively, the present invention is directed to a server capable of transmitting information to a terminal via a communication network, wherein the server includes a contents data database storing a plurality of pieces of contents, and the server transmits contents read from the contents data database to a terminal requesting transmission of the contents, receives use history data with an appliance adapted to use of transmitted contents for the contents from the terminal, and manages use track records of the contents stored in the contents data database based on the use history data received from the terminal.

According to another aspect, the present invention is directed to cooking appliance including: an operating section; an input section for reading cooking data; and an operation-action correspondence database representing the correspondence between the operation performed with the operating section and the action for the cooking data read via the input section, wherein the use frequency of the cooking data for each action is recorded by referring to the operation-action correspondence database.

BRIEF DESCRIPTION OF THE DRAWINGS

FIGS. 3A and 3B are views showing examples of use history data and cooking track record information, respectively.

FIG. 7 is a view showing a use history of cooking data by a user.

FIGS. 8A and 8B are views showing updated use history data and cooking track record information.

FIG. 13 shows an example of an operation-action correspondence database of the microwave oven.

FIG. 15 shows an example of an operation-action correspondence database of the IH cooking heater.

FIG. 17 shows an example of an operation-action correspondence database of the display unit.

FIG. 19 shows an example of use history data.

FIG. 23 shows an example of information representing the correspondence between advertisement information and cooking data.

DESCRIPTION OF THE PREFERRED EMBODIMENTS

Hereinafter, preferred embodiments of the present invention will be described with reference to the accompanying drawings.

Embodiment 1

Figure 1:
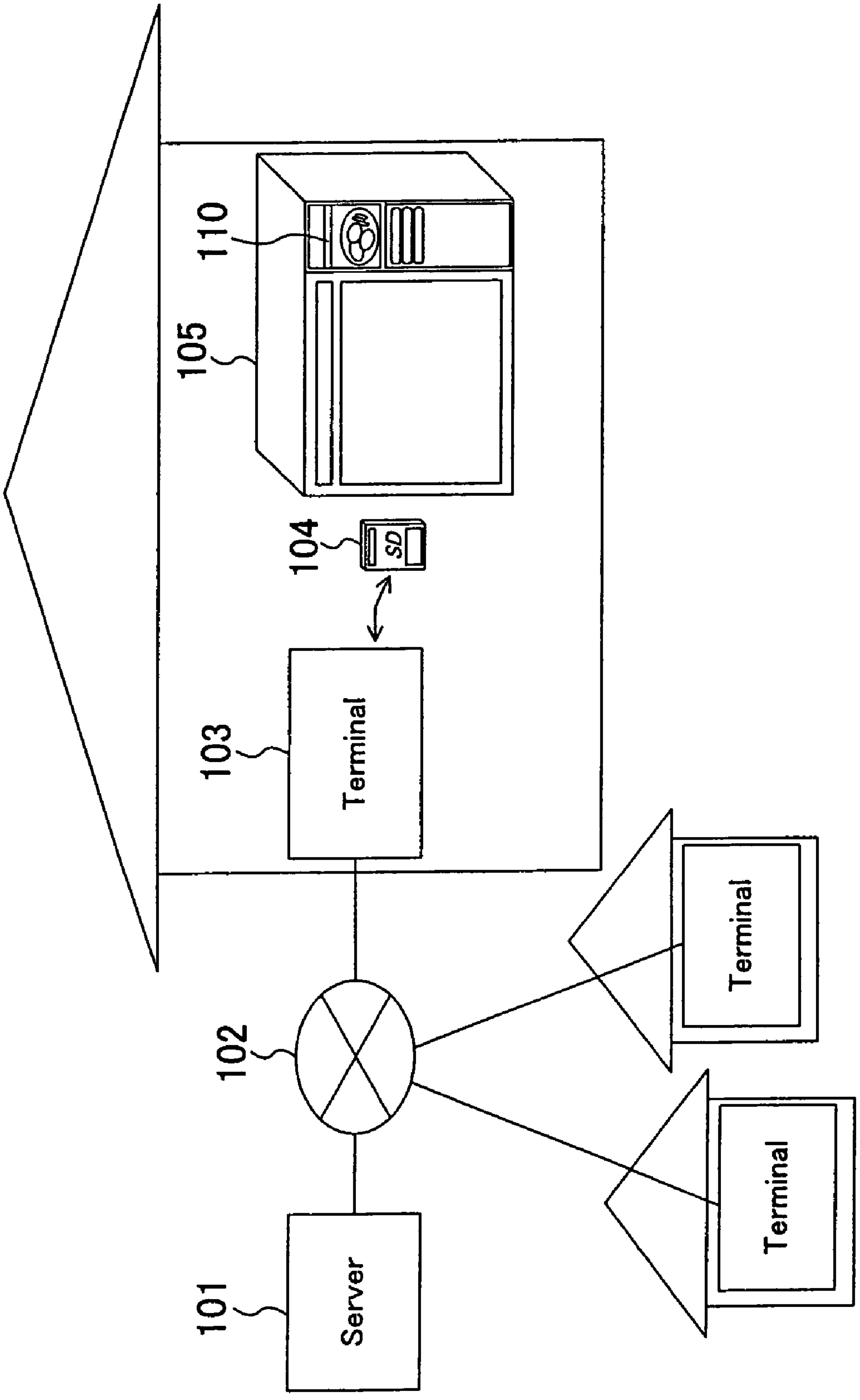
FIG. 1 is a schematic view of the entire architecture of an information communication system in Embodiment 1 of the present invention.

FIG. 1 is a schematic view showing the entire architecture of an information communication system in Embodiment 1 of the present invention. A cooking track record management method and a contents management method of this embodiment are implemented in the information communication system of FIG. 1. Referring to FIG. 1, the information communication system includes: a server 101 responsible for services such as provision of cooking data; a communication network 102 typified by the Internet; a terminal 103 such as a personal computer, a cellular phone and a mobile information terminal; a semiconductor memory card 104 such as an SD card as a recording medium; and a microwave oven 105 as a cooking appliance.

Cooking data includes files such as an image file containing an image of a finished dish for a recipe concerned and an image for cooking advice, a cooking data file regarding the setting of the temperature and the power of a cooking appliance during cooking, and a document file for displaying a cooking procedure, ingredients and their quantities required and the like on a screen.

The microwave oven 105 is adapted to accept insertion of the semiconductor memory card 104 and has a liquid crystal screen 110 for display of the cooking procedure and the like. The semiconductor memory card 104 transfers the cooking data received by the terminal 103 to the microwave oven 105, and also transfers a use track record of cooking data with the microwave oven 105 to the terminal 103.

Figure 2:
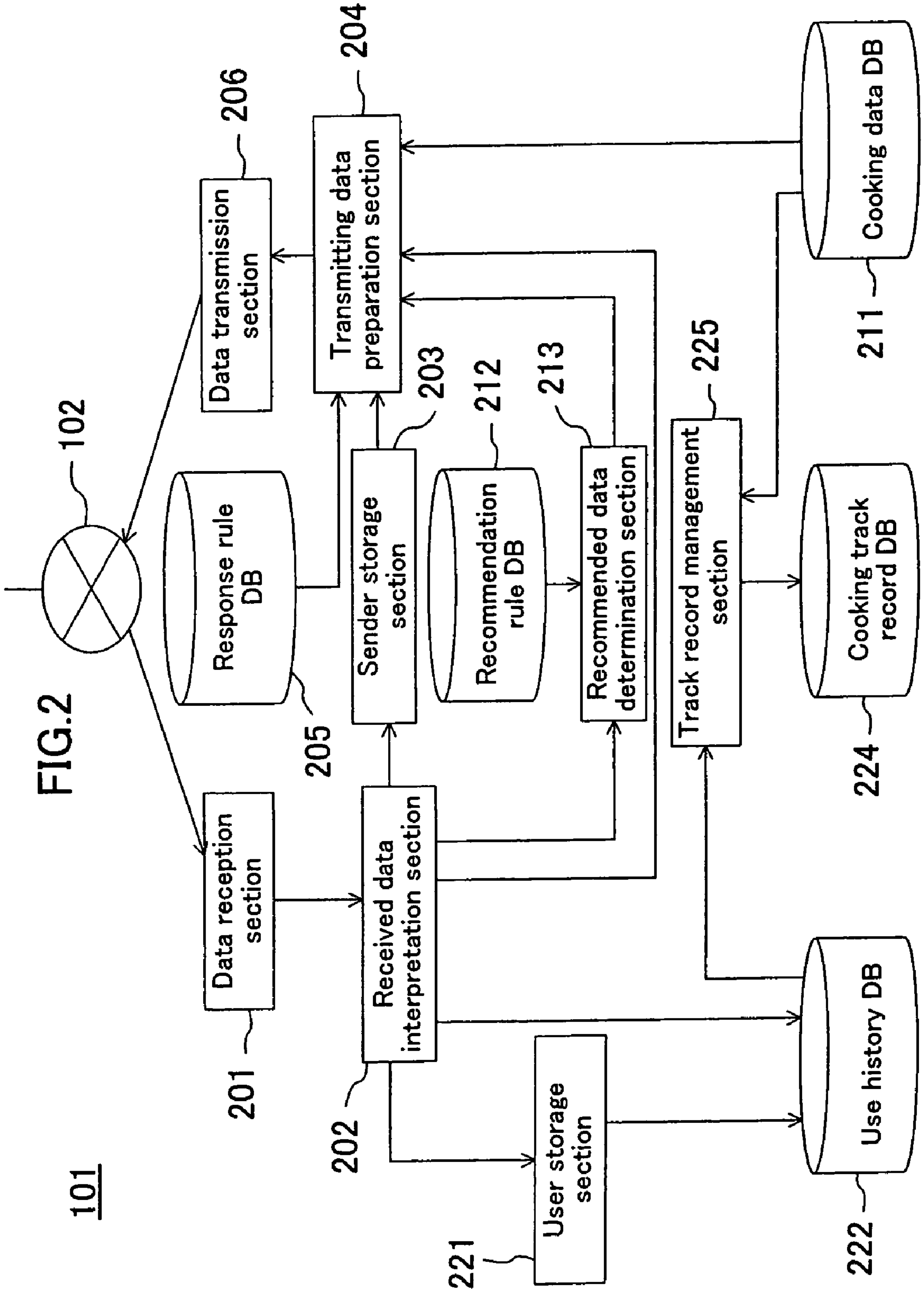
FIG. 2 is a block diagram of a function-oriented configuration of a server in FIG. 1.

FIG. 2 is a block diagram showing a function-oriented configuration of the server 101. Referring to FIG. 2, a data reception section 201 receives data from the communication network 102. A received data interpretation section 202 interprets the data received via the data reception section 201 to specify the sender and information details of the data. A sender storage section 203 stores information specifying the sender of the received data based on the interpretation result from the received data interpretation section 202. A transmitting data preparation section 204 prepares transmitting data according to a response rule stored in a response rule database (DB) 205. A data transmission section 206 transmits the transmitting data prepared by the transmitting data preparation section 204 via the communication network 102.

A cooking data DB 211 stores a plurality of pieces of cooking data to be transmitted to users. A recommendation rule DB 212 stores rules for recommending cooking data to respective users. A recommended data determination section 213 determines cooking data to be recommended to each user by referring to the interpretation result and the recommendation rule DB 212.

A user storage section 221 stores information specifying a user whenever the user accesses the server 101 via the communication network 102 to upload the user's use history data to the server 101 and download cooking data. A use history DB 222 stores use history data of cooking data for each user.

A cooking track record DB 224 stores use track records of the respective pieces of cooking data stored in the cooking data DB 211 for all of users. A track record management section 225 updates the cooking track record DB 224 as appropriate by referring to the user history DB 222 and the cooking data DB 211.

FIG. 3A shows an example of use history data stored in the use history DB 222, and FIG. 3B shows an example of cooking track record information stored in the cooking track record DB 224. As shown in FIG. 3A, the use history DB 222 includes items of user ID for identifying the user, a name representing the user's name and the like, a date of update of the use history (form of YYMMDD in FIG. 3A), a menu title of the cooking data, and the number of times of cooking of the cooking data. In the example of FIG. 3A, it is indicated that user "xxxx" of user ID "002" has cooked "potato gratin" 13 times, for example. As shown in FIG. 3B, the cooking track record DB 224 includes items of the menu title of the cooking data appearing in the cooking data DB 211, the number of times of cooking of the cooking data for all of users, and the ordinal rank in the number of times of cooking. In the example of FIG. 3B, it is indicated that "roast chicken" has been cooked a total of 1305 times for all of users and is ranked in first place.

Figure 4:
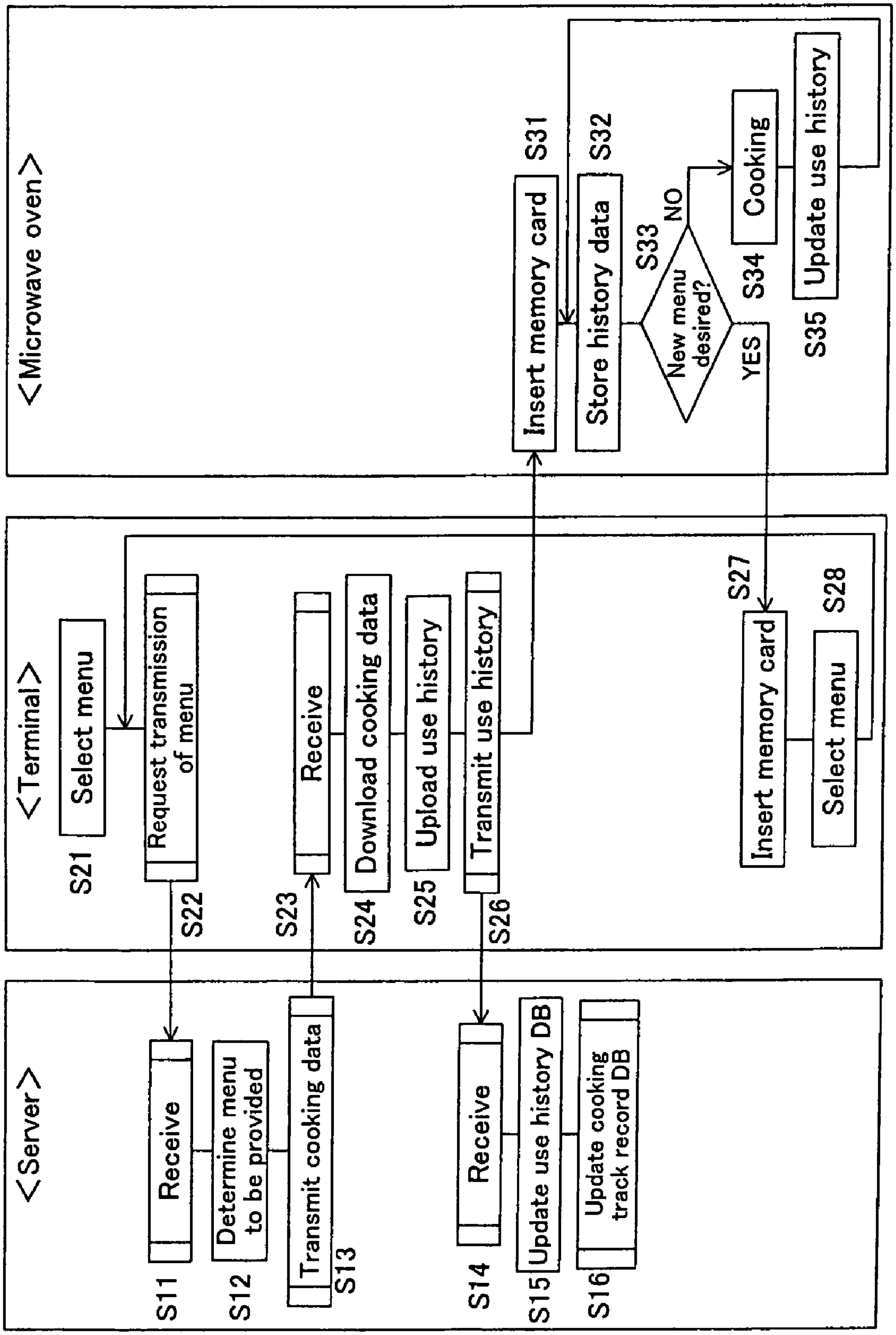
FIG. 4 is a flowchart of a cooking track record management method of Embodiment 1 of the present invention.

FIG. 4 is a flowchart of a cooking track record management method of this embodiment.

Figure 5:
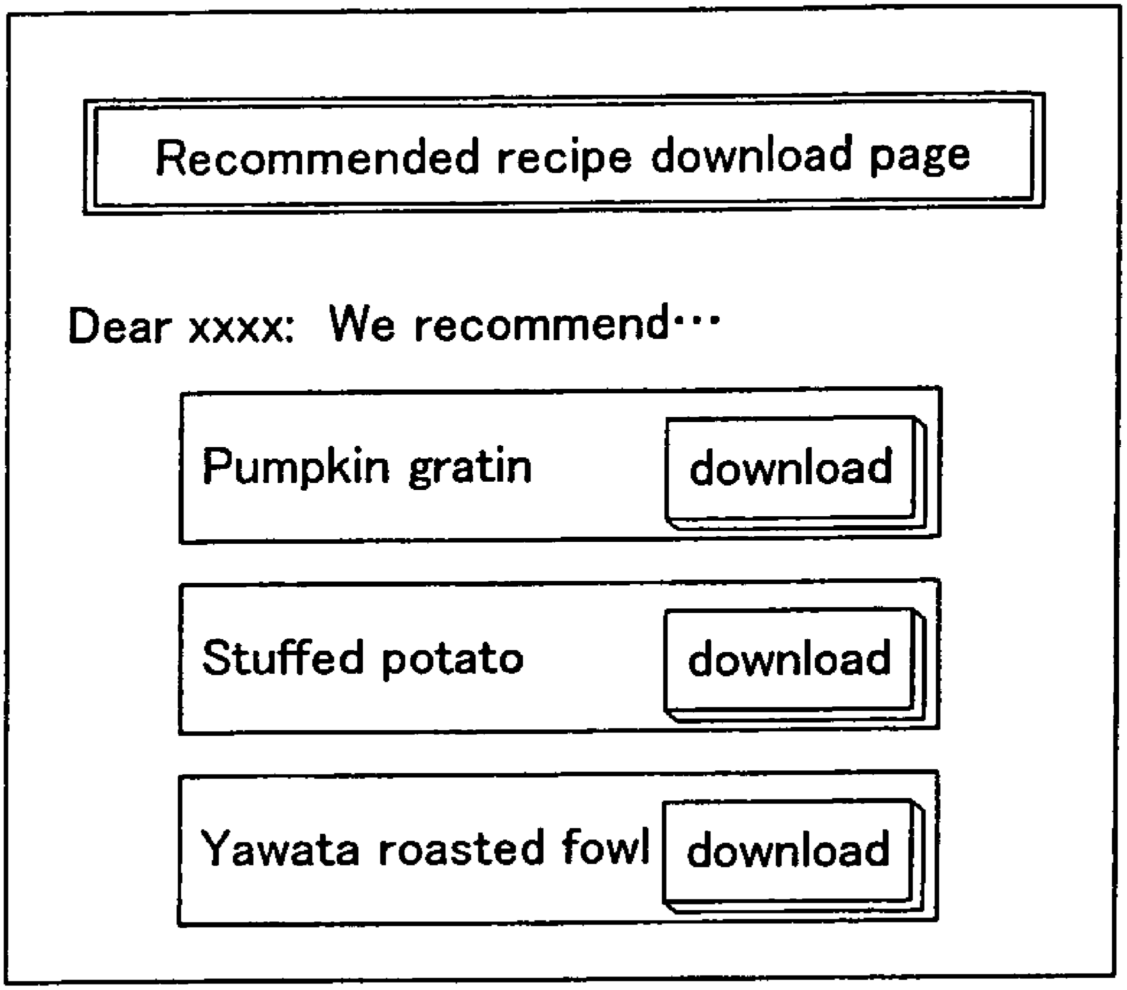
FIG. 5 shows a screen for downloading cooking data.

First, the user opens a homepage for this system with the terminal 103 and selects a menu of cooking data to be downloaded (S21). At this time, the semiconductor memory card 104 is inserted in the terminal 103. FIG. 5 shows an example of a screen for this menu selection. The menus to be displayed on this screen may be chosen considering the season by the server 101, or determined by the recommended data determination section 213 based on the previous cooking history of the user. Assume herein that the user selects "stuffed potato" from the screen of FIG. 5.

When the user clicks the download icon for "stuffed potato", the terminal 103 requests transmission of the selected menu (S22). The server 101, receiving this transmission request (S11), determines the menu to be provided, that is, "stuffed potato" (S12), retrieves cooking data for "stuffed potato" from the cooking data DB 211 and transmits the cooking data (S13).

The terminal 103, receiving the cooking data for "stuffed potato" (S23), downloads the cooking data to the semiconductor memory card 104 (S24). Together with this downloading, use history data stored in the semiconductor memory card 104 is uploaded to the terminal 103 (S25), and then transmitted from the terminal 103 to the server 101 (S26). The server 101, receiving the use history data (S14), updates the use history DB 222 based on the received use history data (S15), and also updates the cooking track record DB 224 (S16).

The user inserts the semiconductor memory card 104 containing the downloaded cooking data for "stuffed potato" into the microwave oven 105 (S31), to start cooking of "stuffed potato" (S34) (steps S32 and S33 will be described later).

Figure 6:
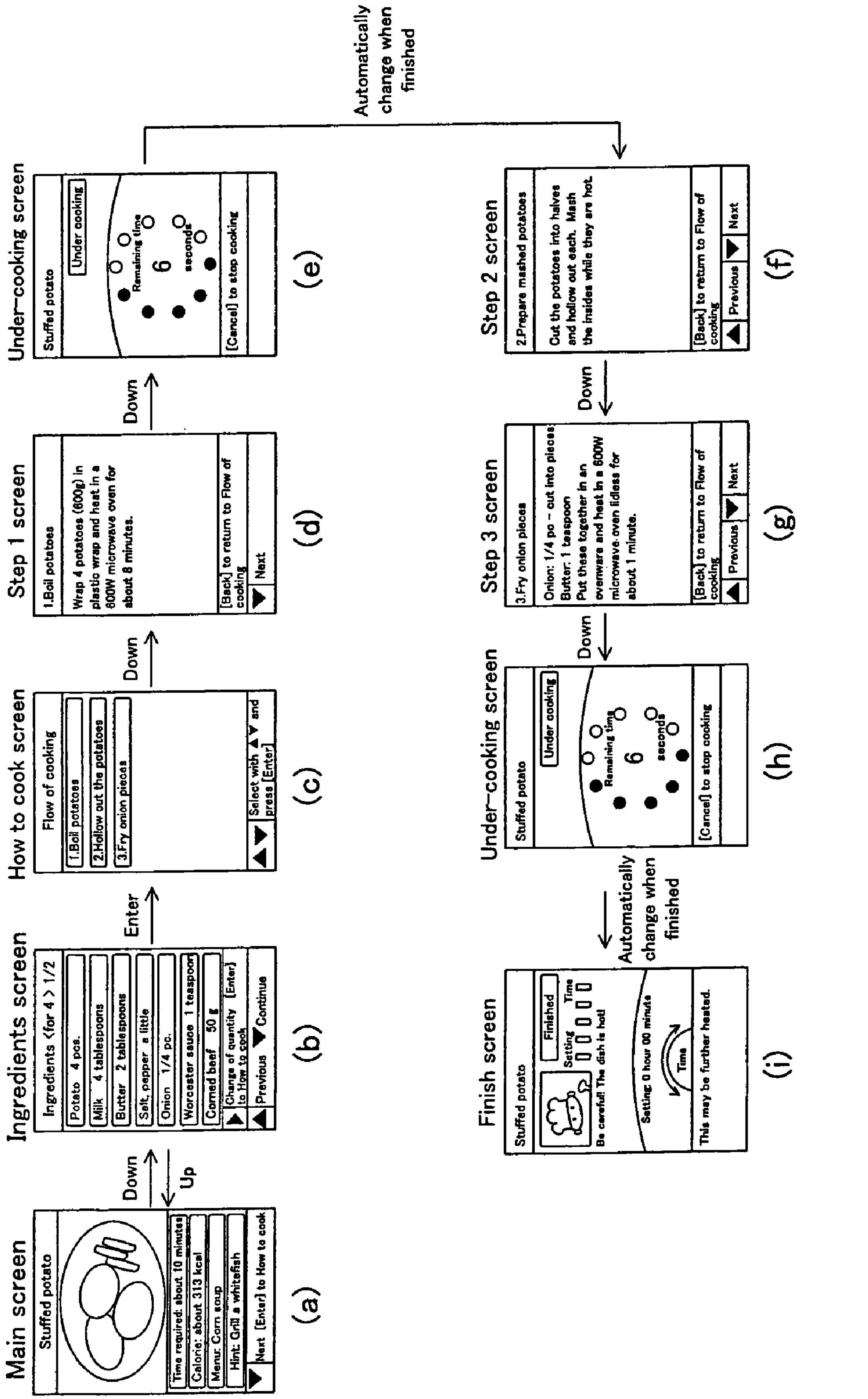
FIGS. 6A to 6I are views showing an example of a cooking sequence with a microwave oven.

FIGS. 6A to 6I show an example of a cooking sequence in the microwave oven 105, which are respectively images displayed on a liquid crystal screen of the microwave oven 105. First, in the main screen of FIG. 6A, an image of a finished dish of "stuffed potato" is displayed together with main data such as the time required and the calorie. In the next Ingredients screen of FIG. 6B, ingredients and their quantities required for cooking "stuffed potato" are displayed. In this Ingredients screen, the quantities can be changed according to the number of family members. Once the quantities are determined, How to cook screen of FIG. 6C is displayed, and cooking is started. The screen changes sequentially with progress of the cooking (FIGS. 6D to 6H). Once the cooking is finished, a finish screen of FIG. 6I is displayed.

Once the cooking is finished, the use history with the microwave oven 105 is updated (S35). In this example, the number of times of cooking of "stuffed potato" is added by one. The use history data is stored in the inserted semiconductor memory card 104 (S32).

The user cooks various menus in similar manners. When a new menu is desired (YES in S33), the user inserts the semiconductor memory card 104 into the terminal 103 (S27). By this time, the semiconductor memory card 104 has stored the latest use history data with the microwave oven 105.

FIG. 7 shows an example of the use history data stored in the semiconductor memory card 104. From the use history data in FIG. 7 it is found that "stuffed potato" has been downloaded three times since the downloading. Also found is that compared with the use history data in FIG. 3A, "potato gratin" has been cooked twice additionally, "sake-dipped steamed fowl" once additionally, "Chinese-flavor eggplant salad" once additionally, and "roasted chicken" four times additionally. A new menu "cheese cake" has also been cooked once.

The user opens the homepage for this system with the terminal 103 to select a menu of cooking data to be downloaded (S28) in the manner described above. Together with downloading of new cooking data, the latest use history data with the microwave oven 105 is uploaded to the server 101 (S11 to S14, S22 to S26). The server 101 updates the use history DB 222 based on the received use history data (S15) and also updates the cooking track record DB 224 (S16).

FIGS. 8A and 8B are views showing the details of the use history data and the cooking track record information updated from those shown in FIGS. 3A and 3B, respectively. In the use history data in FIG. 8A, the use history for user ID "002" has been updated according to the use history data in FIG. 7. In the cooking track record information in FIG. 8B, the number of times of cooking has been updated for the cooking data reflecting new data including the use history data in FIG. 7. For example, the number of times of cooking of "roasted chicken" has widely increased from "1305" to "1355", and "stuffed potato" has appeared as a new menu in twenty-second place.

The cooking track record information as shown in FIG. 8B may be provided to a terminal if the terminal requests transmittance of this information. With this, the user can determine cooking data to be downloaded by checking the popularity of cooking data.

As described above, in this embodiment, it is possible to obtain history data of actual cooking by the user with the microwave oven 105 for each piece of cooking data prepared in the cooking data DB 211. Based on this actual use history data, the use track record of each piece of cooking data can be managed. In this way, use track records of the cooking data corresponding with their actual use status, which will not be grasped with the mere number of times of downloading of the data, can be accurately managed. Various levels of use track record management methods are conceivable. For example, as the simplest method, use history data received from terminals may just be accumulated as they are. Alternatively, use history data may be collected and managed for each user, as in the form shown in FIGS. 3A and 8A. In these cases, the managed use history data may be subjected to conversion and statistical processing by an information processing unit other than the server.

The use history data may be subjected to statistical processing for each user to manage the cooking histories of respective menus on a weekly, monthly or other unit base. By this management, progression of the cooking tendency of the user with the time of year can be accurately grasped, and such grasped result can be reflected in services such as recipe recommendation. Also, as described in this embodiment, by performing statistical processing for all of users as shown in FIGS. 3B and 8B, the popularities of respective menus for all of users can be accurately grasped.

In this embodiment, the microwave oven was used as the cooking appliance. The present invention is also applicable to an IH cooking heater, a refrigerator, a rice cooker, an oven toaster and the like, for example.

In this embodiment, use history data was transmitted/received during transmission of cooking data from the server. The timing of this transmission/reception is not limited to this. For example, the terminal may transmit use history data for so-far received cooking data to the server during requesting transmission of cooking data.

In this embodiment, data was exchanged between the terminal and the cooking appliance using the semiconductor memory card such as an SD card as the recording medium. Another type of recording medium such as a floppy disk and a DVD-RAM may also be used.

In place of using a recording medium, data may be exchanged between the terminal and the cooking appliance via a physical communication network (wired or wireless). In the future, in which home LAN will be widespread, it is expected that cooking appliances will be connected to such home LAN as information home appliances.

If a cooking appliance itself has a communication function, such a cooking appliance can be used as the terminal as it is. In this case, the cooking appliance can directly exchange data with the server.

The server may not transmit cooking data but only receives use history data and manages use track records. For example, a recording medium such as a CD-ROM containing cooking data may be mailed to the user, and the user may transmit use history data via the terminal periodically. Otherwise, when a serviceperson makes periodical visits to the user's house for maintenance of the cooking appliance, he or she may transmit use history data from the terminal.

<Application>

Figure 9:
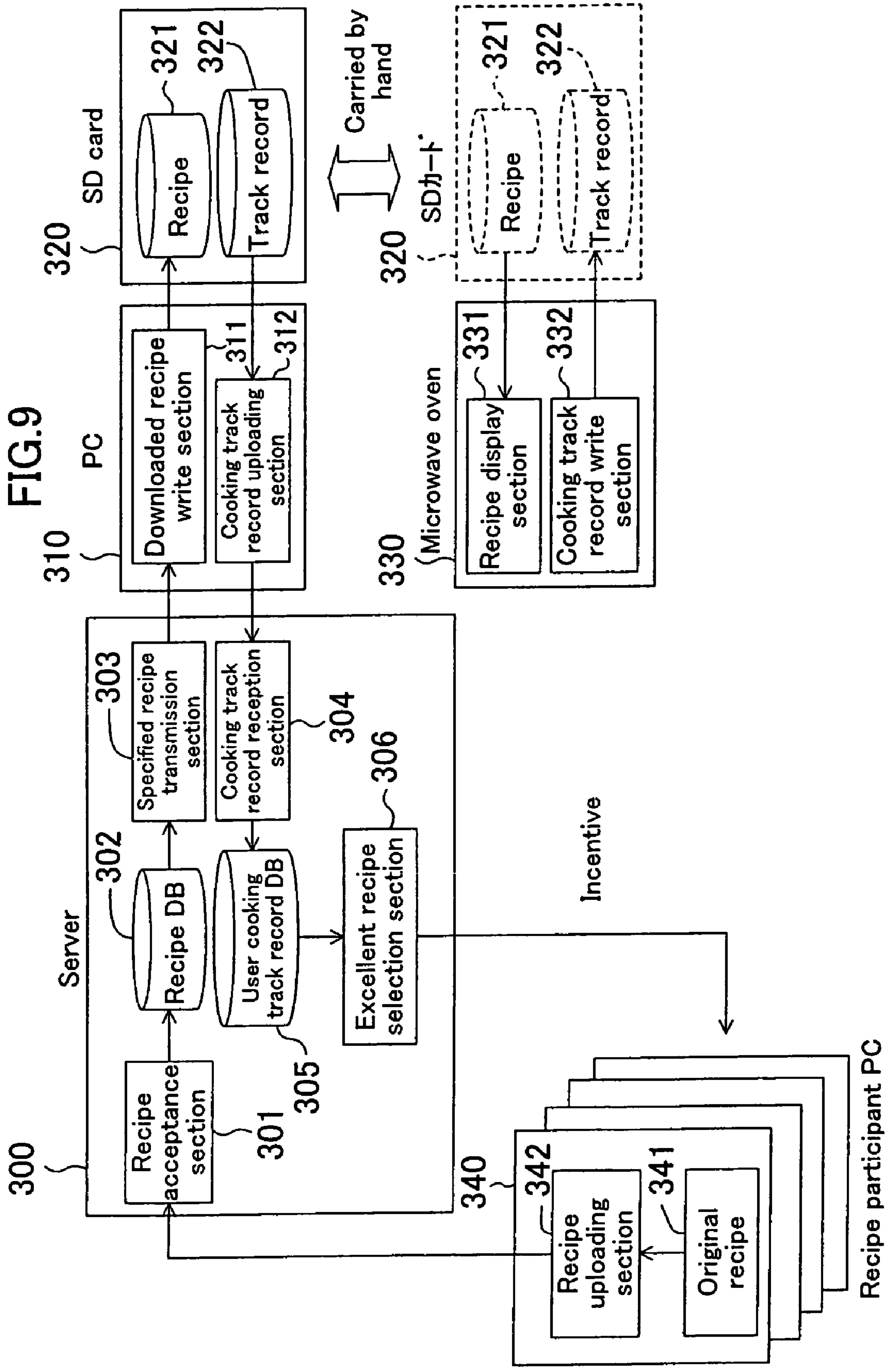
FIG. 9 is a view showing an outline of excellent recipe selection business as an application of the present invention.

The present invention can be used for various business models. For example, FIG. 9 shows an architecture of a model in which original recipes are generally solicited, the popularities of respective original recipes are evaluated as in the embodiment described above, and an incentive such as a reward and a prize is awarded to a person whose recipe has won high popularity and evaluated as excellent. This contributes to increasing the recipe contents and preventing the recipe contents from being used up.

To state specifically, a recipe participant who has created an original recipe 341 transmits the original recipe 341 to a server 300 from a recipe uploading section 342 of a personal computer 340. In the server 300, a recipe acceptance section 301 receives the transmitted original recipe 341, and a recipe DB 302 stores the original recipe 341. A specified recipe transmission section 303 transmits a recipe specified by a user to the user.

In a personal computer 310 of the user receiving a recipe 321, a downloaded recipe write section 311 writes the recipe 321 into an SD card 320. The user inserts the SD card 320 into a microwave oven 330 for cooking. In the microwave oven 330, details of the recipe are displayed on a recipe display section 331, and at this time, a cooking track record write section 332 writes a cooking track record 322 with the microwave oven 330 into the SD card 320.

When the user inserts the SD card back into the personal computer 310 and instructs transmission or performs given operation, the cooking track record 322 written in the SD card 320 is transmitted to the server 300 by a cooking track record uploading section 312. In the server 300, a cooking track record reception section 304 receives the transmitted cooking track record 322, which is then written into a user cooking track record DB 305.

An excellent recipe selection section 306 selects a recipe that has been cooked for the largest number of times, for example, as an excellent recipe based on the use track records of respective original recipes stored in the user cooking track record DB 305. A reward, a prize or the like is awarded to a person who created the selected excellent recipe. If this business model is realized under a tie-up with a food producer such as a ham producer, for example, ham-related original recipes may be solicited and ham may be awarded as a prize for a person who has created an excellent recipe. This will contribute to not only enriching the recipe contents but also increasing the sales of the food producer.

Embodiment 2

In Embodiment 1, cooking data downloaded to the terminal 103 placed in a user's house was used with one cooking appliance (microwave oven) 105 for cooking, and use history data accumulated in the cooking appliance was uploaded to the server 101 via the Internet 102 to be collected in the server 101. In Embodiment 2, cooking data downloaded to the terminal 103 placed in a user's house is used with a plurality of cooking appliances including the microwave oven 105, and use history data accumulated in the respective cooking appliances are uploaded to the server 101.

Figure 10:
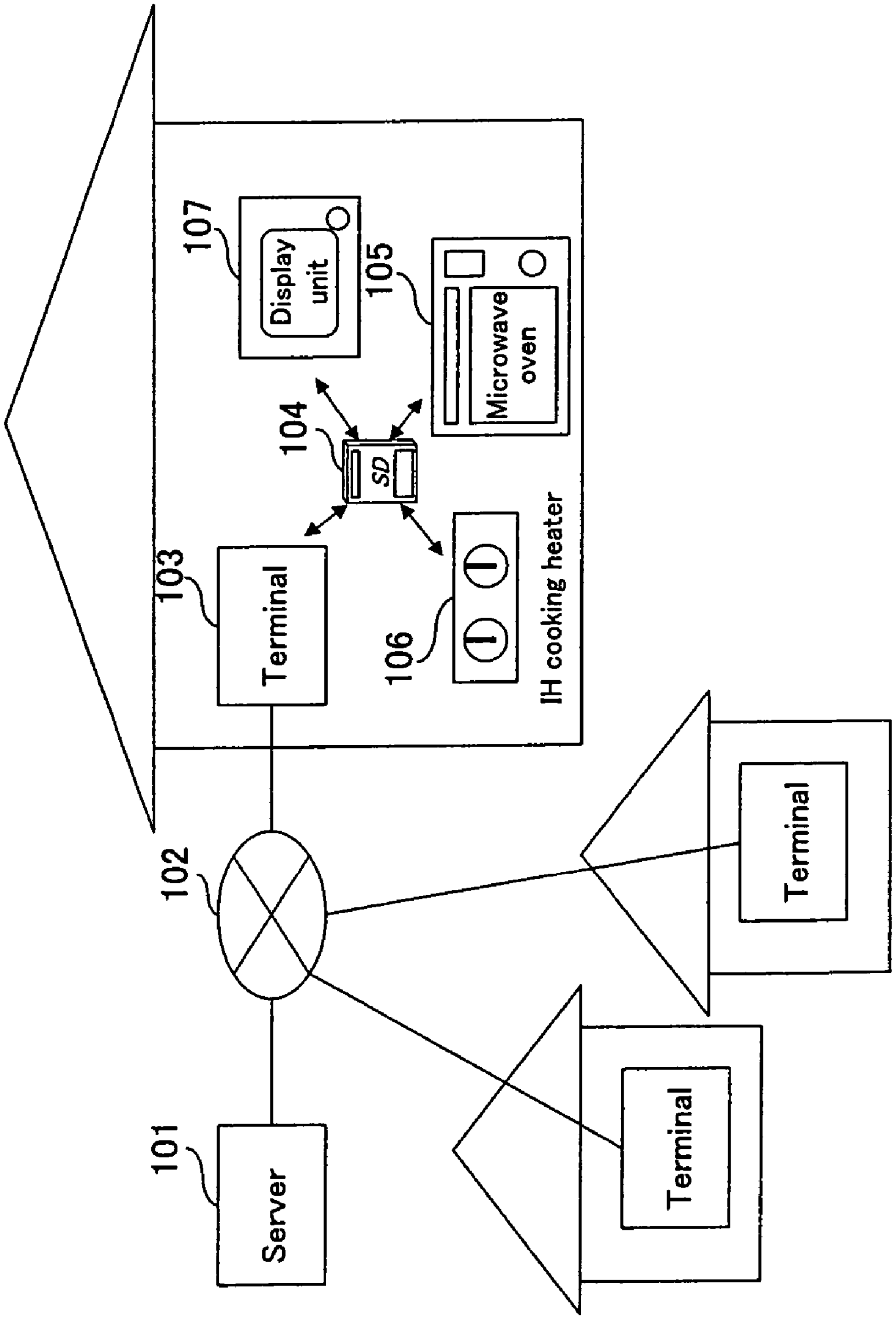
FIG. 10 is a schematic view of the entire architecture of an information communication system in Embodiment 2 of the present invention.

FIG. 10 is a schematic view of the entire architecture of an information communication system in Embodiment 2 of the present invention, in which the same components as those in FIG. 1 are denoted by the same reference numerals and the description thereof is omitted here. In FIG. 10, an IH cooking heater 106 and a display unit 107 are placed in a user's house, in addition to the microwave oven 105. The IH cooking heater 106 is another cooking appliance adapted to cooking according to cooking data recorded on the semiconductor memory card 104. The display unit 107 permits browsing and printing of cooking data recorded on the semiconductor memory card 104.

The user downloads cooking data from the server 101 via the Internet 102 with the terminal 103. The downloaded cooking data can be browsed or cooked with the appliances 105, 106 and 107 by using the semiconductor memory card 104. Use history data are accumulated in the respective appliances 105, 106 and 107 together with information specifying use actions (cooking, browse and print) and contents, and are read to the semiconductor memory card 104 at a predetermined timing. The use history data read to the semiconductor memory card 104 are uploaded to the server 101 from the terminal 103 via the Internet 102 in a manner as that described in Embodiment 1, for example. As in Embodiment 1, the server 101 manages use track records of cooking data based on use history data received from terminals including the terminal 103.

Figure 11:
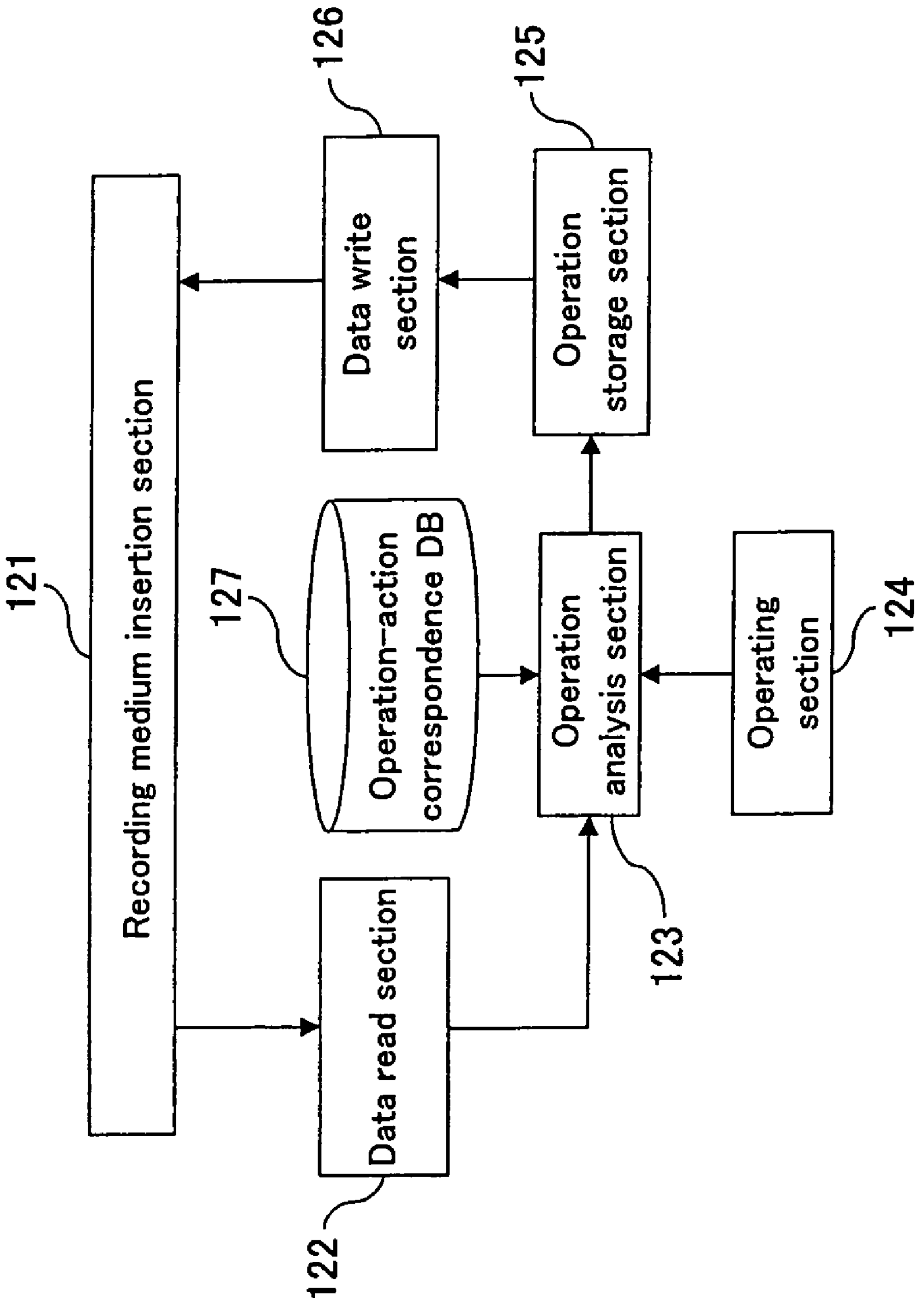
FIG. 11 is a view of a configuration for accumulating use history data for each use.

FIG. 11 shows a configuration of a portion of each appliance for accumulating use history data for each use action. Referring to FIG. 11, a data read section 122 reads cooking data, constructed as shown in FIGS. 6A to 6I, recorded on the semiconductor memory card 104 inserted in a recording medium insertion section 121. That is, the is recording medium insertion section 121 and the data read section 122 constitute an input section for reading cooking data. An operation analysis section 123 analyses an operation performed by the user of the appliance with an operating section 124, to obtain information on what type of operation ("cooking", "browse", "print" or the like) has been performed on which part of the cooking data ("Main screen", "Ingredients screen", "Step 1 screen" or the like, in the example shown in FIGS. 6A to 6I), by referring to the cooking data read by the data read section 122 and an operation-action correspondence DB 127. The information obtained is stored in an operation storage section 125 as use history data. A data write section 126 writes the use history data with this appliance stored in the operation storage section 125 into the semiconductor memory card 104 inserted in the recording medium insertion section 121.

The operation-action correspondence DB 127 is a database including the correspondences between the operations performed with the operating section 124 and the actions on cooking data read into the appliance.

Figure 12:
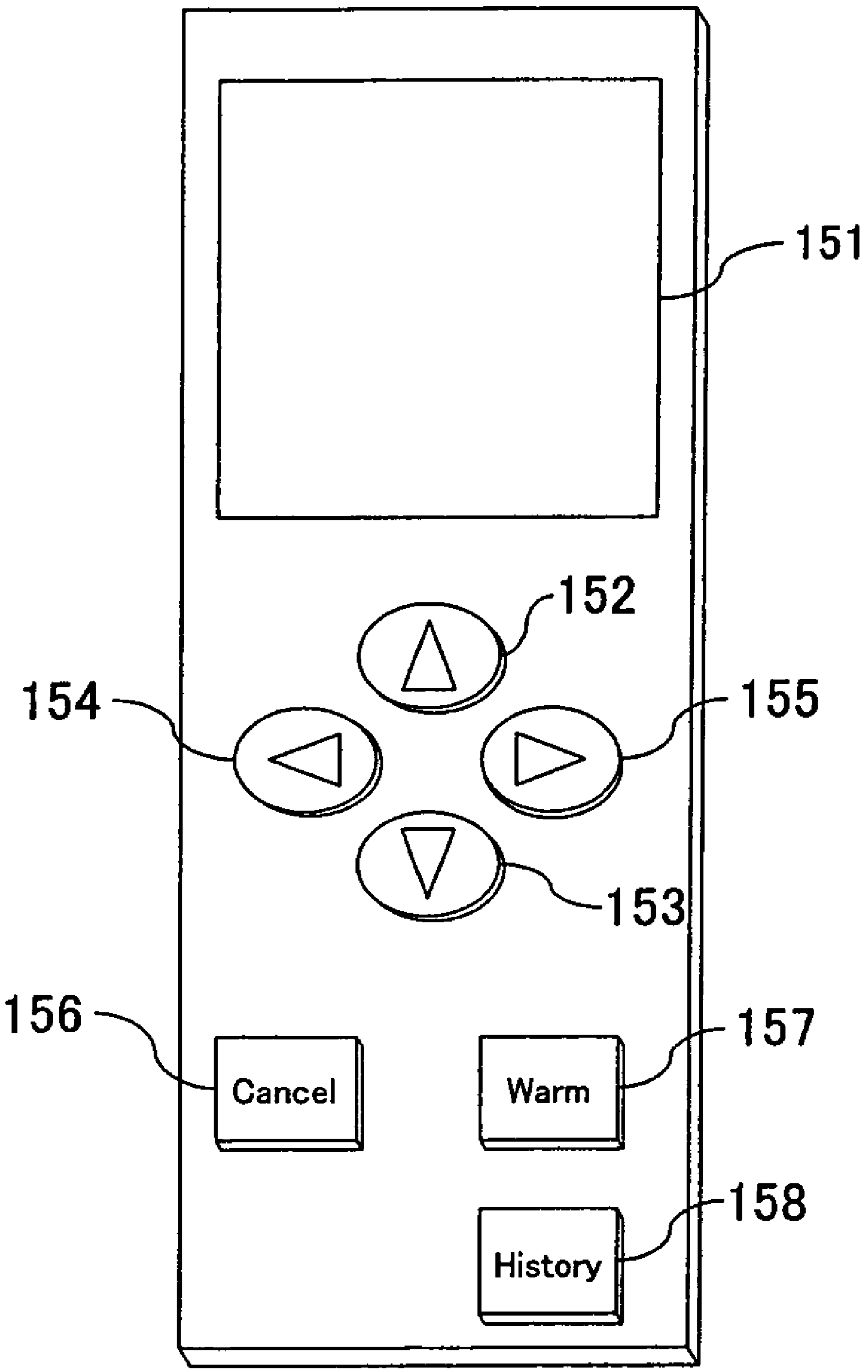
FIG. 12 shows an example of an operating section of a microwave oven.

FIG. 12 shows an example of the operating section of the microwave oven 105. Referring to FIG. 12, a display 151 displays screens of cooking data as those of FIGS. 6A to 6I. The screens of the cooking data on the display 151 change sequentially as in FIGS. 6A to 6I by operating operation keys 152, 153, 154 and 155, which are respectively "Up" key, "Down" key, "Left" key and "Right" key. "Warm" key 157 is used for heating food, and "Cancel" key 156 is used for canceling heating. "History" key 158 is operated when use history data accumulated in the appliance is to be written into the semiconductor memory card 104.

FIG. 13 shows an example of the operation-action correspondence DB 127 of the microwave oven 105. The example of FIG. 13 adopts a format of associating each "Operation key" shown in FIG. 12 with the "Action" meant by the operation key. For example, the operation of the user pressing the "Down" key 153 is associated with the action "Browse" because this operation corresponds to browsing the next step of the cooking data. The operation of the user pressing the "Warm" key 157 is associated with the action "Cooking" because this operation corresponds to heating food placed in the microwave oven 105.

This operation-action correspondence DB 127 is referred to when the user performs some operation with the appliance, to interpret the action represented by the operation. The operations performed by the user are different among appliances having different functions. Therefore, the operation-action correspondence DB 127 is necessary for each appliance.

Figure 14:
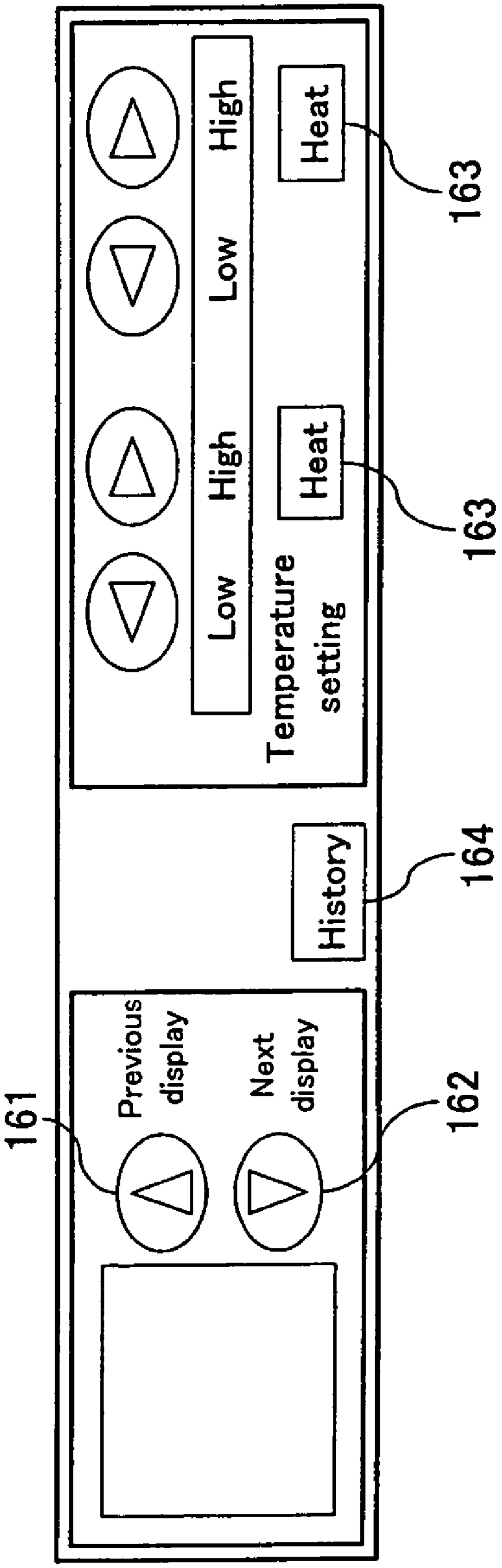
FIG. 14 shows an example of an operating section of an IH cooking heater.

FIGS. 14 and 15 respectively show the operating section and the operation-action correspondence DB 127 of the IH cooking heater 106. In FIG. 14, "Previous display" key 161 and "Next display" key 162 are operated for browsing the previous screen and the next screen, respectively, in the sequence of cooking data. "Heat" key is operated for cooking by heating of the cooking data that is currently being browsed, and "History" key is operated for writing use history data into the semiconductor memory card 104. In FIG. 15, it is described that the "Previous display", "Next display" and "Heat" keys are associated with the actions "Browse", "Browse" and "Cooking", respectively.

Figure 16:
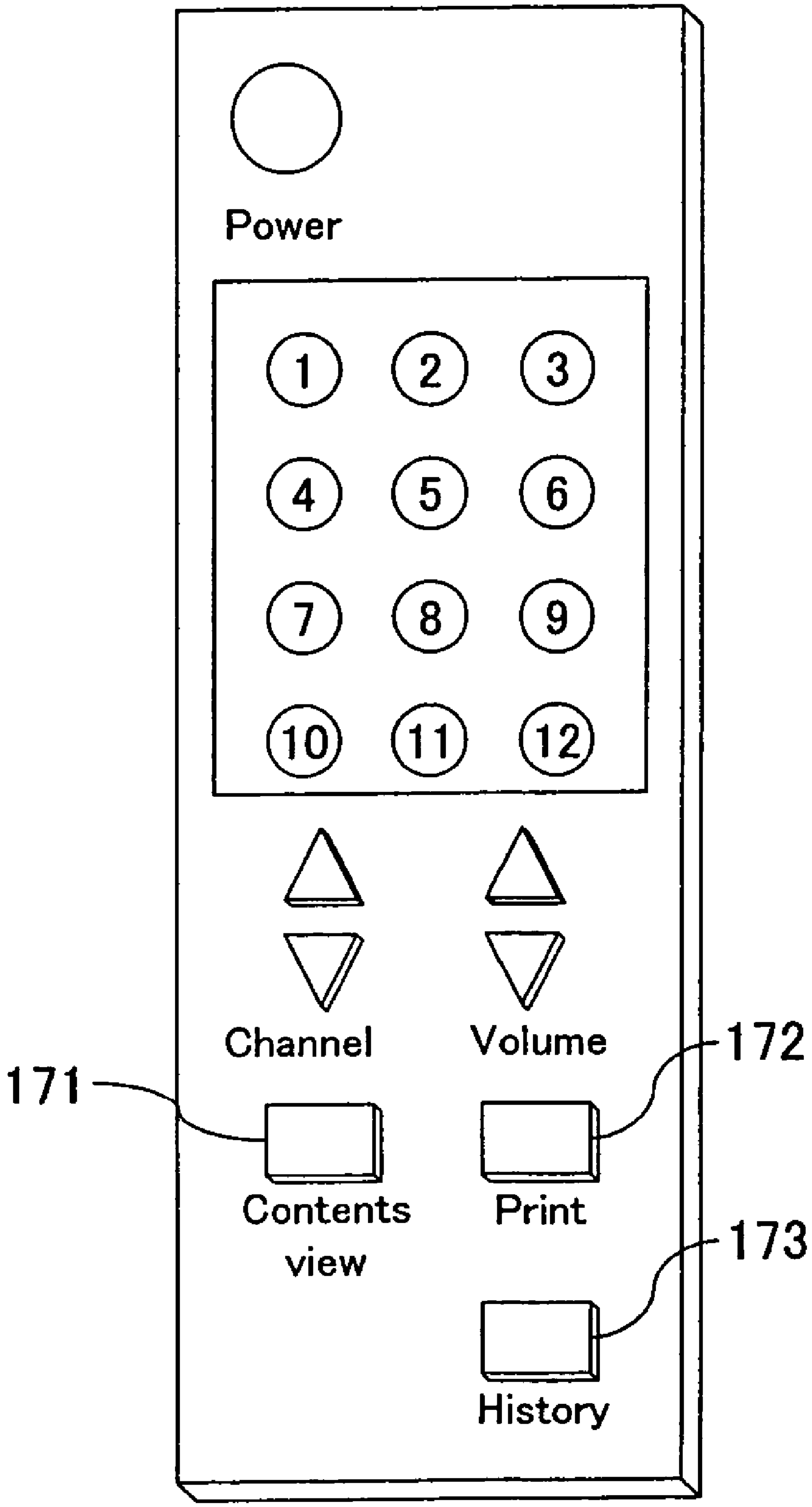
FIG. 16 shows an example of a remote controller for operation of a display unit.

FIGS. 16 and 17 respectively show a remote controller and the operation-action correspondence DB 127 of the display unit 107. Referring to FIG. 16, "Contents view" key 171 is operated for browsing cooking data, "Print" key 172 is operated for printing the cooking data that is currently being browsed, and "History" key 173 is operated for writing use history data into the semiconductor memory card 104. In FIG. 17, it is described that the "Contents view" key and the "Print" key are associated with the actions "Browse" and "Print", respectively.

Figure 18:
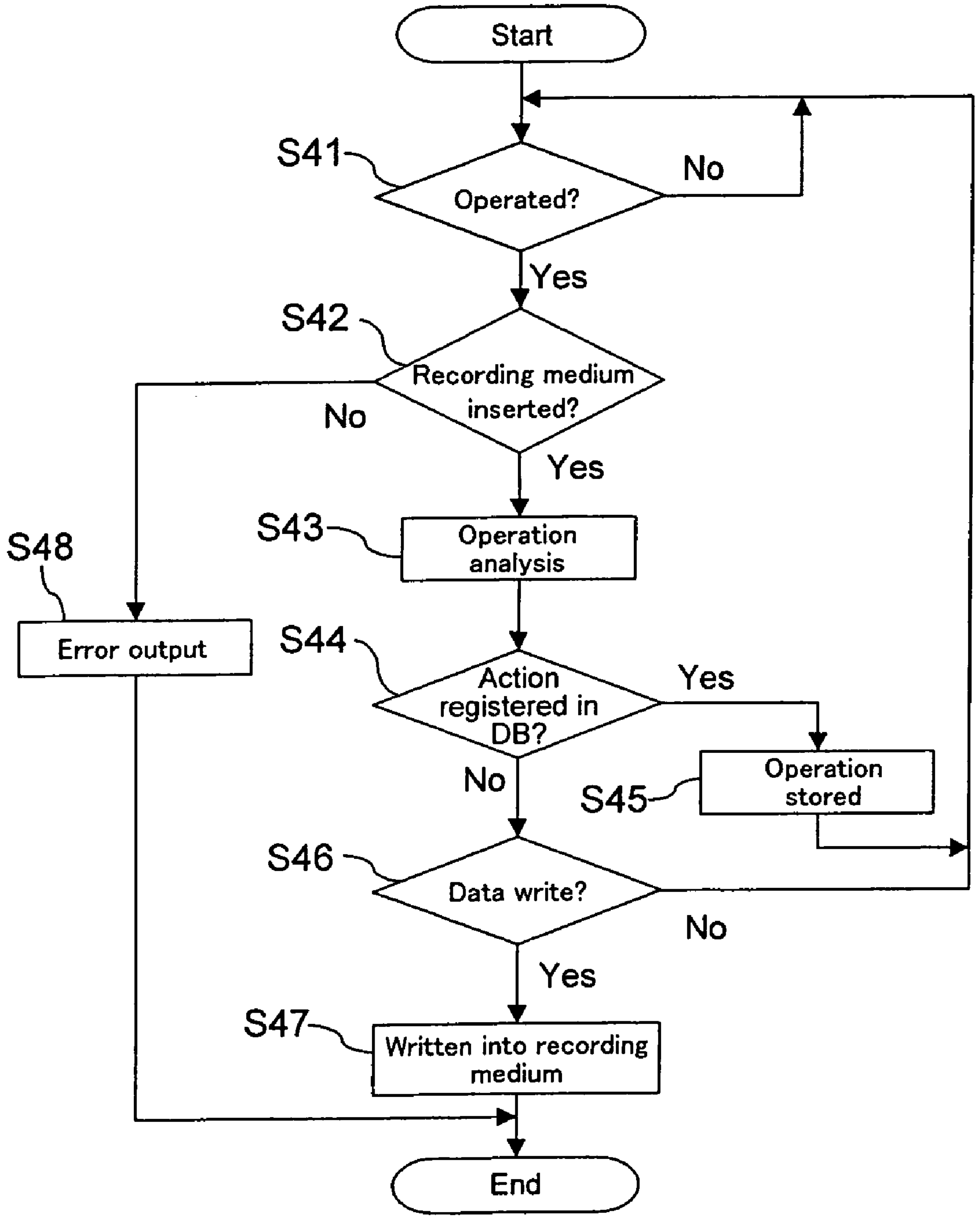
FIG. 18 is a flowchart showing accumulation of use history data.

Next, a sequence in which the history of operation performed by the user with an appliance is written into the semiconductor memory card 104 will be described with reference to FIG. 18.

When the user operates any of the operation keys of the operating section 124 (S41), the appliance checks whether or not the semiconductor memory card 104 storing the cooking data to be referred to for cooking and browsing has been inserted in the recording medium insertion section 121 (S42). If the semiconductor memory card 104 has not been inserted, a message notifying the user of an error is displayed (S48). If it has been inserted, the operation analysis section 123 analyzes the operation performed by the user (S43) and determines whether or not the analyzed operation is in the operation-action correspondence DB 127 (S44). If the operation is in the database, the action associated with the operation is stored in the operation storage section 125 (S45). If it is not in the database, the operation analysis section 123 determines whether or not the operation is pressing the "History" key, that is, whether or not the operation indicates a request for writing the accumulated use history data (S46). If the operation is a request for writing the data, the data write section 126 writes the use history data accumulated in the operation storage section 125 into the semiconductor memory card 104 inserted in the recording medium insertion section 121 (S47).

FIG. 19 shows an example of use history data written in the semiconductor memory card 104. As shown in FIG. 19, the use history data includes items such as "Contents title" representing the recipe name of cooking data concerned, "Appliance used" representing the appliance operated, "Action" associated with the operation, "Screen" (Main screen, Ingredients screen, Step screens and the like shown in FIGS. 6A to 6I) in the sequence of the cooking data on which the action has been made, and the "Frequency" of the action.

The use history data with the display unit 107 is written into the semiconductor memory card 104 when the "History" key 173 of the remote controller shown in FIG. 16 is pressed. In the example shown in FIG. 19, for "Stuffed potato", it is recorded as the use history with the display unit 173 that "Browse" has been executed once on the "Main" screen, and "Browse" and "Print" have been executed once each on the "Ingredient" screen.

The use history data with the microwave oven 105 is written into the semiconductor memory card 104 when the "History" key 158 of the operating section shown in FIG. 12 is pressed. In the example shown in FIG. 19, for "Stuffed potato", it is recorded as the use history that "Browse" has been executed once on the "Main" screen and "Browse" and "Cooking" have been executed once each on the "Step 1" screen.

The use history data with the IH cooking heater 106 is written into the semiconductor memory card 104 when the "History" key 164 shown in FIG. 14 is pressed. In the example shown in FIG. 19, for "Stuffed potato", it is recorded as the use history that "Browse" and "Cooking" have been executed once each on the "Step 3" screen.

The use history data stored in the semiconductor memory card 104 as shown in FIG. 19 is uploaded to the server 101 via the Internet 102 in a manner as that described in Embodiment 1, for example. With the network architecture shown in FIG. 10, the server 101 can collect and accumulate use history data from a plurality of users. Based on the collected use history data, the use track records of the cooking data are managed as described in Embodiment 1.

As described above, in this embodiment, the use history data includes the item indicating the frequency of use of cooking data for each action (cooking, browse and print). This makes it possible to manage actual use track records of cooking data for each action. In addition, use history data is obtained for each appliance, separately for a cooking appliance such as the microwave oven and the IH cooking heater and an appliance adapted to browsing/printing of cooking data such as a display unit, and the use history data includes the item indicating the frequency of use of cooking data for each appliance. This makes it possible to manage actual use track records of cooking data for each type of appliance, for example. Moreover, the use frequency is recorded for each part of the cooking data, such as each screen. This makes it possible to grasp how each part of the cooking data is actually used in more detail.

In this embodiment, the use history data is written into the semiconductor memory card 104 when the user presses the "History" key of the appliance. The timing of writing of the use history data is not limited to this, but the timing as described in Embodiment 1, for example, may be adopted.

The format of the use history data is not limited to that shown in FIG. 19, but other items of information, such as information relating to the time of execution of each action and information specifying the user who executed each action, may be included.

The operation-action correspondence DB 127 is not necessarily provided in each appliance. For example, each action by the user may be identified by the kind of key pressed, and the use frequency may be recorded for each kind of key.

Embodiment 3

In Embodiment 3, advertisement information is inserted in cooking data to be transmitted, and the frequency at which the advertisement information has been browsed is obtained based on use history data for the cooking data.

Figure 20:
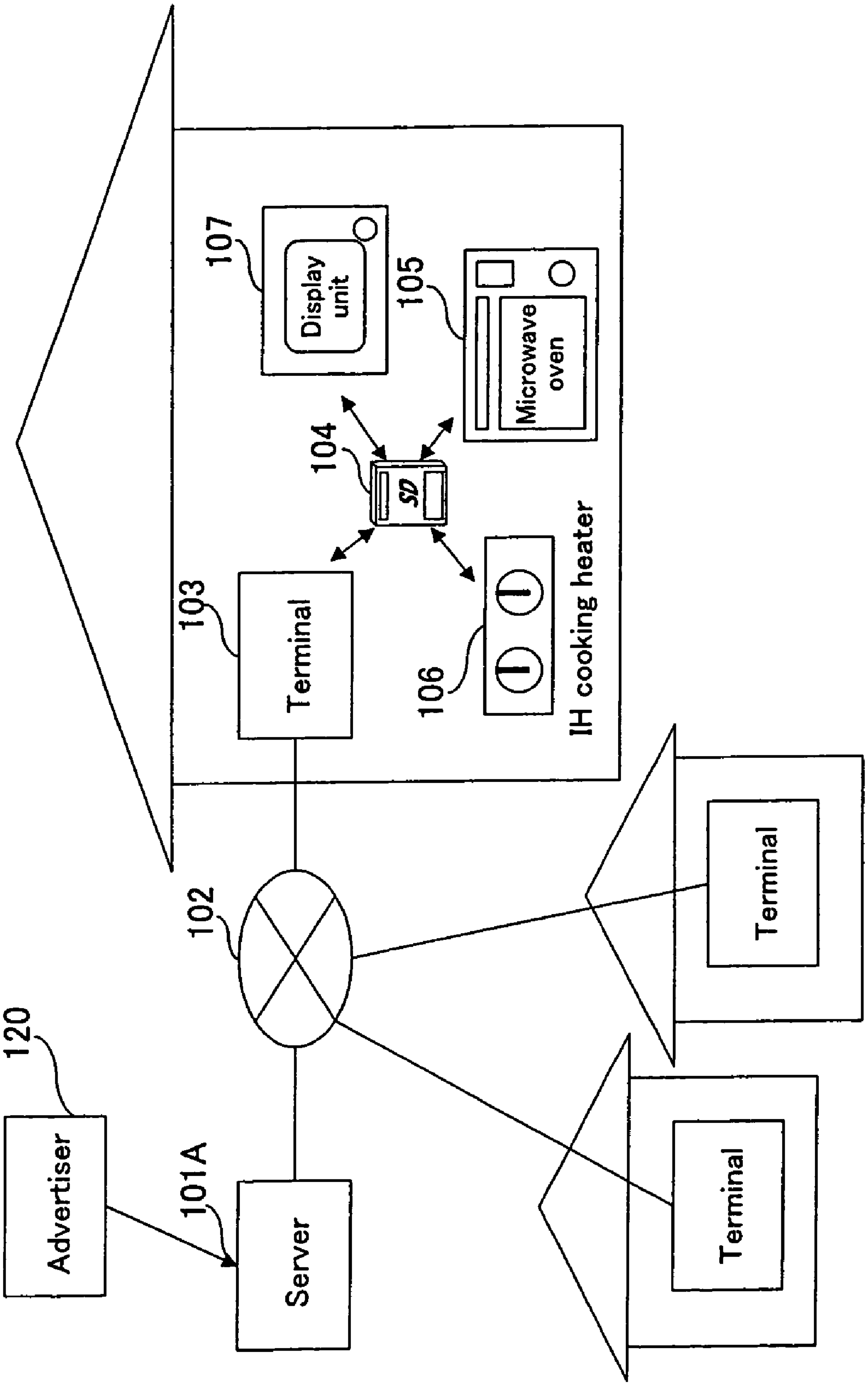
FIG. 20 is a schematic view of the entire architecture of an information communication system in Embodiment 3 of the present invention.

FIG. 20 is a schematic view of the entire architecture of a system in Embodiment 3 of the present invention, in which the same components as those in FIG. 10 are denoted by the same reference numerals and the description thereof is omitted here. In FIG. 20, an advertiser 120 requests a server 101A, who distributes cooking data to terminals placed in users' houses and receives use history data for the cooking data, to insert advertisement information into cooking data.

Figure 21:
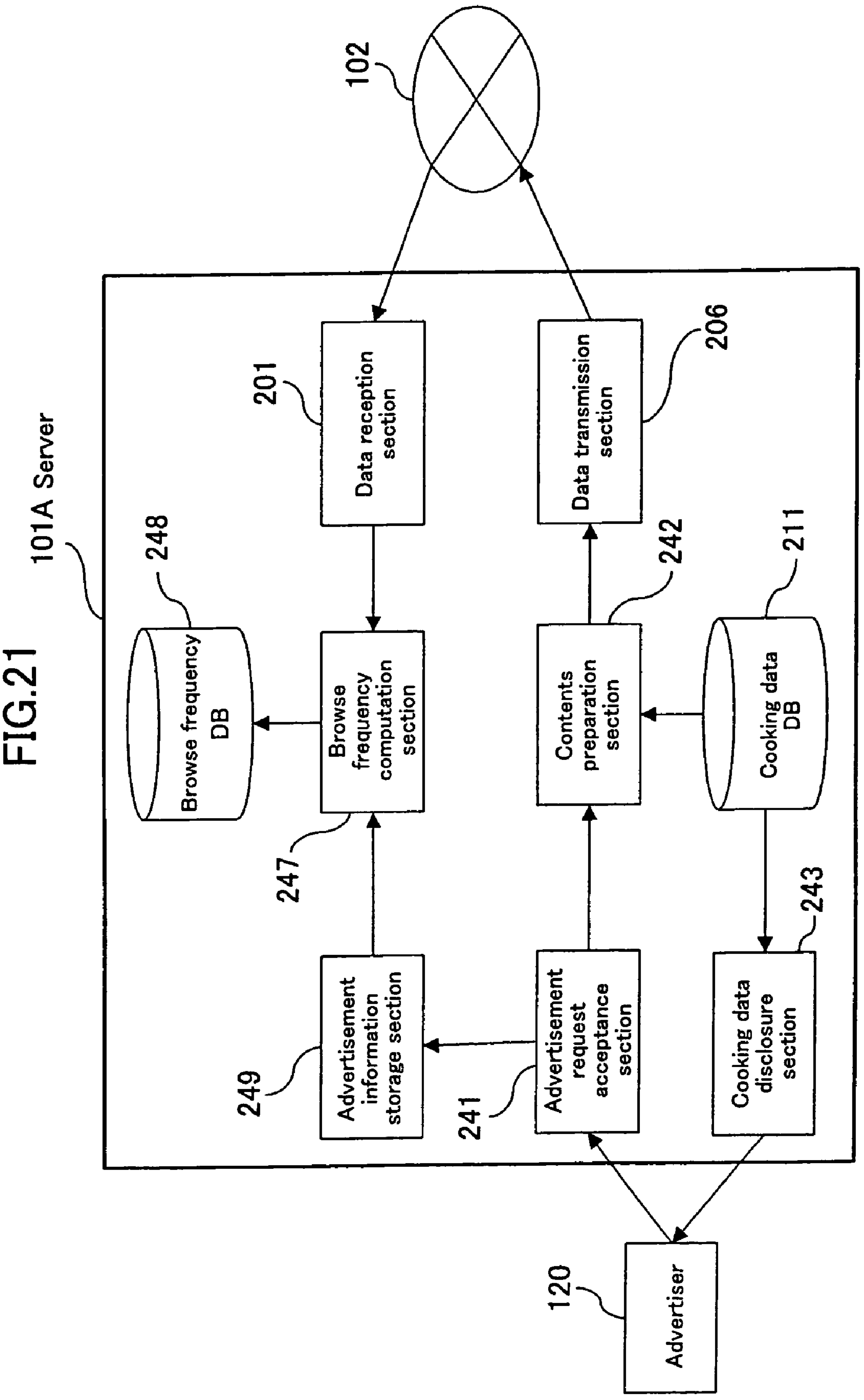
FIG. 21 is a block diagram of a function-oriented configuration of a server in FIG. 20.

FIG. 21 is a block diagram showing a function-oriented configuration of the server 101A, in which only main part relating to this embodiment is shown. The same components as those in FIG. 2 are denoted by the same reference numerals. A cooking data disclosure section 243 discloses contents information held in the cooking data DB 211 to the advertiser 120. An advertisement request acceptance section 241 accepts advertisement information, together with information designating the cooking data into which insertion of the advertisement information is desired, from the advertiser 120 who has received the disclosure. A contents preparation section 242 prepares advertisement information-added cooking data based on the request received from the advertiser 120 and the cooking data stored in the cooking data DB 211. An advertisement information storage section 249 stores information representing the correspondence between information specifying the advertiser 120 and the cooking data into which the advertisement is inserted.

The data transmission section 206 transmits advertisement information-added cooking data prepared by the contents preparation section 242 to a user's house, and the data reception section 201 receives use history data from the user's house. A browse frequency computation section 247 computes the frequency at which the advertisement information of the advertiser 120 has been browsed from the received use history data based on the information stored in the advertisement information storage section 249. A browse frequency DB 248 stores the browse frequency of the advertisement information computed by the browse frequency computation section 247 in association with the information specifying the advertiser 120.

Figure 22:
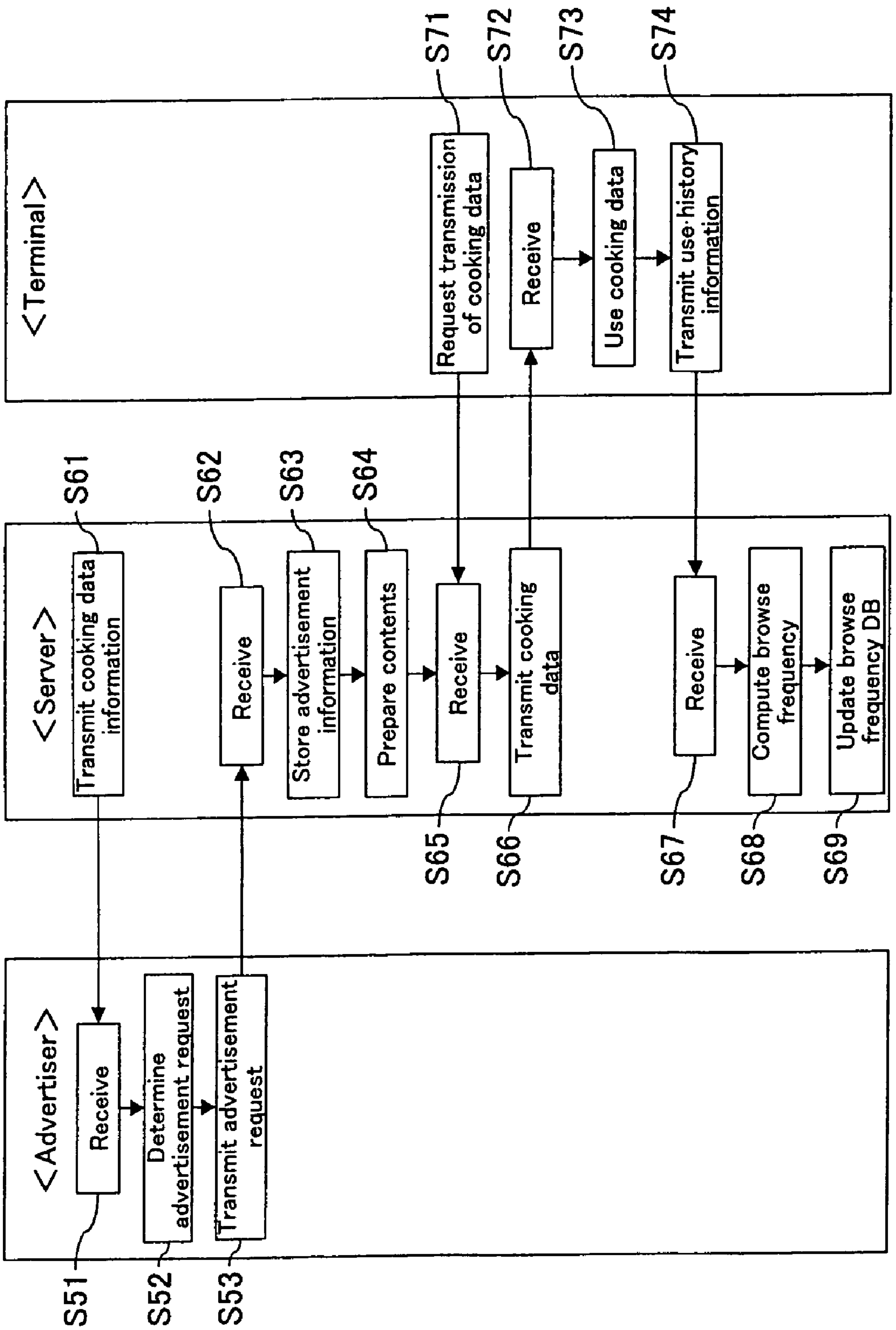
FIG. 22 is a flowchart showing processing in Embodiment 3 of the present invention.

A flow of processing in this embodiment will be described with reference to FIG. 22.

In the server 101A, the cooking data disclosure section 243 discloses cooking data held in the cooking data DB 211 to the advertiser 120 (S61). The advertiser 120 receives the cooking data (S51), determines which advertisement information should be inserted into which cooking data (S52), and transmits the determined result to the server 101A (S53).

In the server 101A, the advertisement request acceptance section 241 receives the request from the advertiser 120 (S62), and the advertisement information storage section 249 stores information representing the correspondence between information specifying the advertiser 120 and the cooking data into which the advertisement is to be inserted (S63). FIG. 23 shows an example of the information stored in the advertisement information storage section 249, which indicates that advertisement information of "Smile Food" as the advertiser is inserted into the main screen of cooking data "Stuffed potato". Herein, the main screen is one of the screens of the cooking data shown in FIGS. 6A to 6I.

Figure 24:
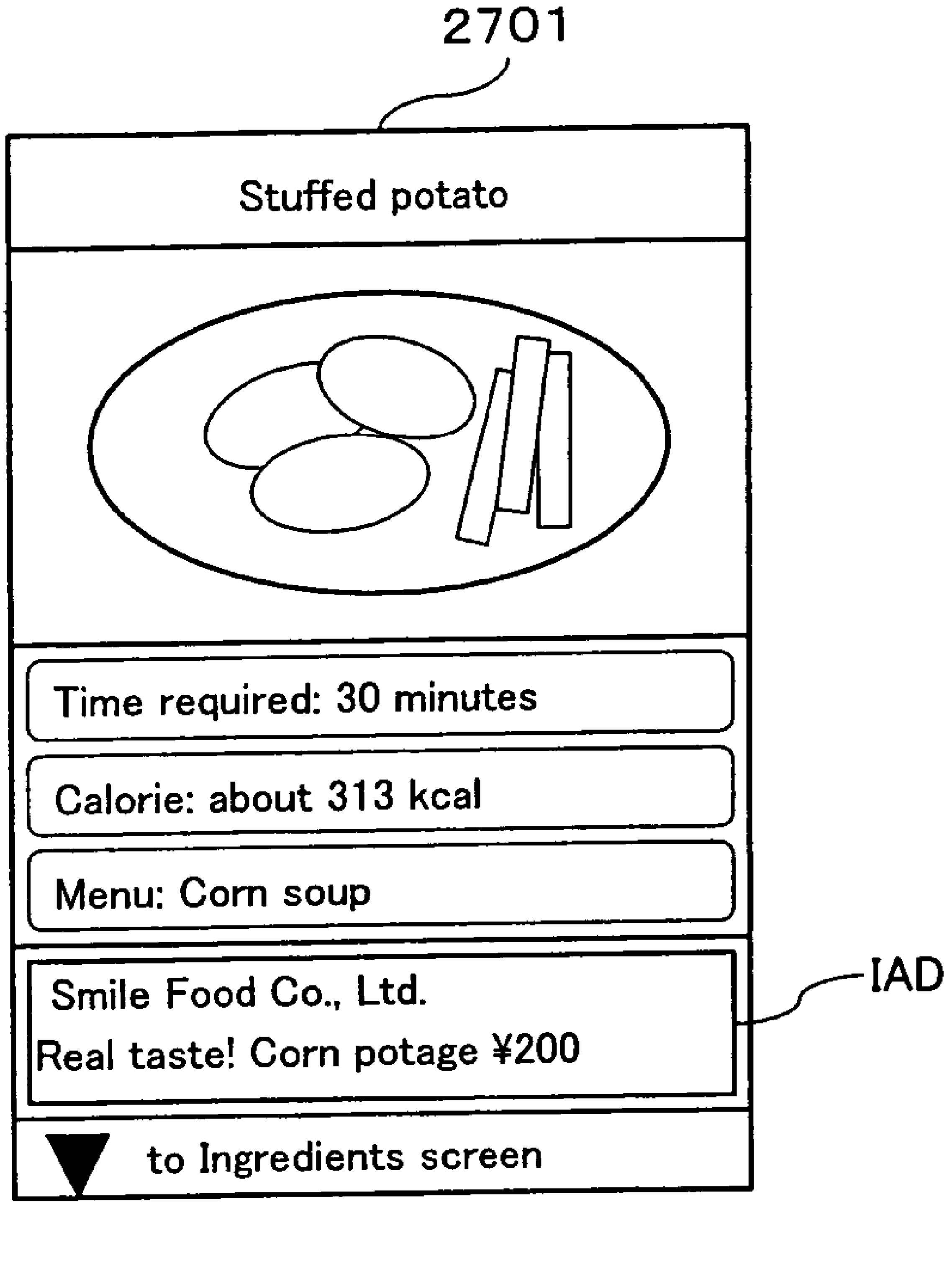
FIG. 24 shows an example of advertisement information-inserted cooking data.

The contents preparation section 242 of the server 101A prepares advertisement information-added cooking data (S64). FIG. 24 shows an example of advertisement information-added cooking data. In FIG. 24, advertisement information IAD of "Smile Food" appears on the main screen of the cooking data shown in FIGS. 6A to 6I.

The user requests transmission of cooking data with the terminal 103 (S71). Receiving the request, the data transmission section 206 of the server 101A transmits advertisement information-inserted cooking data as that shown in FIG. 24 prepared by the contents preparation section 242 to the terminal 103 (S66).

When the terminal 103 receives the cooking data (S72), the user performs actions such as browsing, cooking and printing for the cooking data with the microwave oven 105, the IH cooking heater 106, and the display unit 107 (S73). As a result of the actions, use history data as that shown in FIG. 19 is accumulated in the semiconductor memory card 104 as described in Embodiment 2.

The terminal 103 transmits the use history data to the server 101A (S74). In the server 101A, the data reception section 201 receives the use history data transmitted from the terminal 103 (S67), and the browse frequency computation section 247 computes the browse frequency based on the use history data (S68).

The browse frequency is computed in the following manner, for example. It is found from the information shown in FIG. 23 stored in the advertisement information storage section 249 that the advertisement information of "Smile Food" is inserted in the main screen of the cooking data "Stuffed potato". The browse frequency computation section 247 counts the number of times of browsing of the main screen of "Stuffed potato" by the users from the received use history data. In the example of use history data shown in FIG. 19, for example, "Browse" of the main screen has been executed a total of two times, that is, once in the display unit 107 and once in the microwave oven 105. Therefore, two is the browse frequency computed by the browse frequency computation section 247.

Based on the browse frequency for each user computed by the browse frequency computation section 247, the browse frequency DB 248 is updated (S69).

As described above, in this embodiment, an advertiser can be notified of information on how often advertisement information of the advertiser has been browsed by users. This enables adoption of a business model of billing the advertiser according to the browse frequency, for example.

In the embodiments described above, track records of cooking data as contents were managed. The present invention is also effective for information contents other than cooking data. That is, if it is possible to collect use history data of the contents with appliances adapted to use of the contents, actual use track record of the contents can be managed, in place of a mere downloading track record. For example, when the contents are movie data, use history data with visual equipment adapted to reproduction of the movie data may be collected. When the contents are music data, use history data with audio equipment adapted to reproduction of the music data may be collected. In this way, as in the embodiments described above, it is possible to manage use track records of contents more corresponding with their actual use status.

As described above, according to the present invention, use track records of cooking data corresponding with their actual use status, which will not be grasped with mere counting the number of times of downloading of the data, can be accurately managed. Also, use track records of contents corresponding with their actual use status can be accurately managed.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A cooking track record management method using a server capable of transmitting information to a terminal via a communication network, the terminal exchanging information with a plurality of appliances, each of the plurality of appliances having at least one of cooking function, browsing function and printing function, the server including a cooking data database storing a plurality of recipes, the method comprising the steps of:

transmitting a first recipe read from the cooking data database to the terminal requesting transmission of the first recipe, the terminal corresponding to a first user of a plurality of users;

receiving from the terminal use history data specific to the first user, the use history data including a number of times that a recipe from the plurality of recipes has been prepared by the first user using at least one of the plurality of appliances;

maintaining use history data specific to each of the plurality of users in a use history database, wherein the use history data for each of the plurality of users is determined by acquired use history specific to each user;

managing use track records of the recipes stored in the cooking data database based on the use history data in the use history database, wherein the use track records indicate popularity of each of the plurality of recipes among the plurality of users; and recommending a second recipe of the plurality of recipes to a second user of the plurality of users based on the popularity of the second recipe and the use history data of the second user in the use history database.

2. The cooking track record management method of claim 1, wherein the server receives the use history data for previously transmitted cooking data from the terminal when the server receives a request for transmission of cooking data from the terminal or when the server transmits cooking data to the terminal.

3. The cooking track record management method of claim 1, wherein the server transmits the managed use track records of recipes to a terminal which requests transmission of the use track records.

4. The cooking track record management method of claim 1, wherein at least one of the plurality of appliances is a microwave oven.

5. The cooking track record management method of claim 1, wherein the first recipe transmitted to the terminal is given to an appliance of the plurality of appliances via a recording medium, wherein the appliance has cooking function, and the use history data of the appliance is given to the terminal via the recording medium.

6. The cooking track record management method of claim 1, wherein at least one appliance of the plurality of appliances having cooking function has a communication function and operates as the terminal.

7. The cooking track record management method of claim 1, wherein the terminal transmits use history data to the plurality of appliances including appliances having cooking function.

8. The cooking track record management method of claim 7, wherein the use history data includes data representing a use frequency of at least one of the plurality of recipes for each appliance.

9. The cooking track record management method of claim 1, wherein the server transmits advertisement information-inserted cooking data, and the server computes browse frequency of the advertisement-information inserted cooking data based on the use history data for at least one of the plurality of recipes.

10. A cooking track record management method using a server capable of communicating with a terminal via a communication network and the terminal exchanging information with a plurality of appliances, the method comprising the steps of:

receiving use history data for a first user of a plurality of users, the use history data of the first user including at least one of browsing history of at least one of a plurality of recipes by any one of a plurality of appliances corresponding to the first user, and printing history for at least one of the plurality of recipes by any one of the plurality of appliances corresponding to the first user, from a terminal of the first user;

maintaining use history data for each of the plurality of users in a use history database, wherein the use history data for each of the plurality of users is determined by acquired use history specific to each user of the plurality of users;

managing a use track record of the recipes based on the use history data in the use history database, wherein the use track records indicate popularity of each of the plurality of recipes among the plurality of users; and recommending a second recipe from the plurality of recipes to a second user of the plurality of users based on the popularity of the second recipe and the user history data of the second user in the use history database.

11. A system for transmitting information to a terminal via a communication network and the terminal exchanging information with a plurality of appliances, the system comprising:

a cooking data database storing a plurality of recipes;

an output module embodied as computer executable instructions residing on a computer memory that transmits at least one of the plurality of recipes read from the cooking data database to the terminal of a first user of a plurality of users requesting transmission of the at least one of the plurality of recipes, an input module embodied as computer executable instructions residing on a computer memory that receives use history data for the first user including at least one of browsing history of at least one of the plurality of recipes by any one of the plurality of appliances corresponding to the first user, and printing history for at least one of the plurality of recipes by any one of the plurality of appliances corresponding to the first user, from the terminal;

a use history database that maintains use history data for each of the plurality of users, wherein the use history data for each of the plurality of users is determined by the acquired use history specific to each user;

a management module embodied as computer executable instructions residing on a computer memory that manages use track records of the recipes stored in the cooking data database based on the use history data in the use history database, wherein the use track records indicate popularity of each of the plurality of recipes among the plurality of users; and the output module further transmits a second recipe from the plurality of recipes to a second user of the plurality of users based on the popularity of the second recipe and the user history data of the second user in the use history database.

12. A cooking track record management method, for managing a plurality of recipes associated with a plurality of users, using a server capable of transmitting information to a terminal via a communication network, the terminal exchanging information with a plurality of appliances each of the plurality of appliances having at least one of cooking function, browsing function and printing function, the server including a cooking data database storing the plurality of recipes, the method comprising the steps of:

receiving each of the plurality of recipes by the cooking data database;

transmitting a first recipe of the plurality of recipes from the cooking data database to the terminal requesting the first recipe for a first user of the plurality of users;

acquiring, from the terminal, use history data specific to each of the plurality of users using the plurality of appliances, wherein the use history data including a number of times a recipe, from the plurality of recipes, was prepared by each user using at least one of the plurality of appliances;

maintaining a user history for each of the plurality of users at a use history database, wherein the user history for each of the plurality of users is determined by the acquired use history data specific to each user and using each of the plurality of appliances;

generating and managing, at a cooking track record database, use track records for each of the plurality of recipes based on all user histories stored in the use history database, wherein the use track records indicate popularity of each of the plurality of recipes among all the plurality of users; and recommending a second recipe of the plurality of recipes to a second user of the plurality of users based on the popularity of the second recipe and the user history for the second user from the use history database.

* * * * *

UNITED STATES PATENT AND TRADEMARK OFFICE

CERTIFICATE OF CORRECTION

PATENT NO. : 7,685,256 B2
APPLICATION NO. : 10/474545
DATED : March 23, 2010
INVENTOR(S) : Takahiro Kudo et al.

It is certified that error appears in the above-identified patent and that said Letters Patent is hereby corrected as shown below:

In column 14, line 60, claim 9, "the server computes browse frequency" should read -- the server computes a browse frequency --

Signed and Sealed this

Thirty-first Day of August, 2010

David J. Kappos

David J. Kappos
*Director of the United States Patent and Trademark Office*